United States Patent [19]

Murphy

[11] Patent Number: 4,501,342

[45] Date of Patent: Feb. 26, 1985

[54] SLIP PLATES FOR LIFT RACK

[75] Inventor: John W. Murphy, Waukegan, Ill.

[73] Assignee: Ammco Tools, Inc., North Chicago, Ill.

[21] Appl. No.: 499,845

[22] Filed: Jun. 1, 1983

[51] Int. Cl.$^{3}$ .............................................. G01L 5/00

[52] U.S. Cl. .............................................. 187/8.41

[58] Field of Search .................... 187/8.41, 8.67, 8.77; 248/352, 346; 108/143; 254/90

[56] References Cited

U.S. PATENT DOCUMENTS 3,190,395 6/1965 Lill .................................... 187/8.67

FOREIGN PATENT DOCUMENTS 628269 12/1963 Belgium .

*Primary Examiner*—Joseph J. Rolla
*Assistant Examiner*—Andrew Jones
*Attorney, Agent, or Firm*—Edmond T. Patnaude

[57] ABSTRACT

A laterally movable slide plate includes a plurality of sets of circumferentially grooved wheels which are supported on a plurality of mutually parallel rods carried on a base plate. At least one of the rods has a raised intermediate portion under which a hold down pin removably extends to prevent spurious disassembly of the slide plate from the base plate.

6 Claims, 5 Drawing Figures

SLIP PLATES FOR LIFT RACK

The present invention relates in general to laterally movable slide plates for supporting an automotive vehicle during the performance of repair and maintenance work on the vehicle, and it relates in particular to a new and improved slide plate assembly for use in vehicle support racks and the like.

BACKGROUND OF THE INVENTION

In order to relieve the wheels of an automotive vehicle of any transverse stress during a wheel alignment operation, it is a common practice to incorporate a laterally movable slide plate in each of the tracks on which the vehicle is supported during the wheel alignment procedure. When the rear of the vehicle is lifted off the tracks, the wheels will frequently be cambered inwardly of their normal positions. By using the laterally movable slide plates, when the rear wheels are lowered onto the slide plates, the plates move freely to relieve any stress in the wheels so that they return to their normal operating positions.

SUMMARY OF THE INVENTION

Briefly, in accordance with the teachings of the present invention there is provided a slide plate assembly comprising a plurality of rails mounted on the top face of a base plate in substantial parallel relationship and a top plate on which a wheel of an automotive vehicle is adapted to rest, a plurality of sets of circumferentially grooved wheels being journaled to the top plate and resting on the rails. The wheels are spaced from the top surface of the base plate so that grease and debris which collects on the base plate does not interfere with the smooth, free movement of the top plate.

In a preferred embodiment of the invention two of the rails having upstanding, generally U-shaped, offset portions and the top plate has apertured depending flanges through which a pair of retaining pins extend to prevent spurious removal of the top plate from the base plate. Also, two or more wheels are provided in each set with only the wheels in one set being shimmed to prevent axial movement thereof and the other wheels being transversely movable along their respective axes whereby misalignment of the wheels and/or of the rails does not result in jamming of the top rail realtive to the base plate.

GENERAL DESCRIPTION OF THE DRAWINGS

The present invention will be better understood by a reading of the following detailed description taken in connection with the accompanying drawings wherein.

DETAILED DESCRIPTION OF A PREFERRED EMBODIMENT OF THE INVENTION

Figure 1:
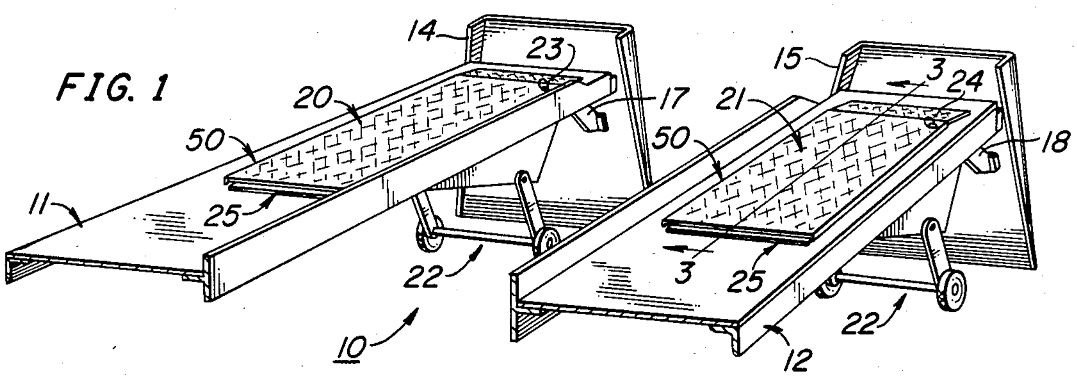
FIG. 1 is a perspective view of the rear end portion of a wheel alignment rack which includes a pair of slide plate assemblies embodying the present invention.

Referring particularly to FIG. 1, there is shown the rear portion of a wheel alignment rack 10 comprising a pair of parallel tracks 11 and 12 onto which an automotive vehicle may be driven when the rear ends of the track are in their lowermost positions. The rack is shown in an elevated position with a pair of ramps 14 and 15 hanging downwardly with their upper end portions extending above the respective ends of the tracks to provide stops which prevent a vehicle from rolling off the rack when the rear ends of the tracks are elevated. The ramps are pivotally mounted to the rear portions of the tracks by linkage arms 17 and 18 so as to be moved by the force of gravity into the depending stop positions as the rear ends of the tracks are lifted by any suitable power jack means (not visible in the drawing). The power means are mechanically connected to the wheel assemblies 22 so as to swing the wheel assemblies counterclockwise as viewed in FIG. 1 to lift the rear ends of the tracks away from the floor on which the wheel assemblies rest.

In order to relieve any transverse stresses on the rear wheels of the vehicle being serviced on the rack 10, a pair of slide plate assemblies 20 and 21 are mounted on the track members 11 and 12 near the rear ends thereof so that the rear wheels of the vehicle may rest on these assemblies. The top surfaces of slide plate assemblies are free to move in a lateral direction when locking pin 23 and 24 are removed. However, with the pins 23 and 24 in place the top surfaces are held in fixed relationship with the tracks. In use, after the rear end of a vehicle which is on the rack has been jacked up, the locking pins 23 and 24 can be removed so that when the wheels of the vehicle are subsequently lowered onto the slide plates, the plates will move laterally to permit the wheels to assume their normal operating positions before the wheels alignment procedure is completed. This is of particular importance where the vehicle has an independent rear wheel suspension. Accordingly, it is important that the slide plates move freely so that the camber angles of the rear wheels are normal while the vehicle is on the rack and its wheel alignment is being measured and adjusted.

Figure 2:
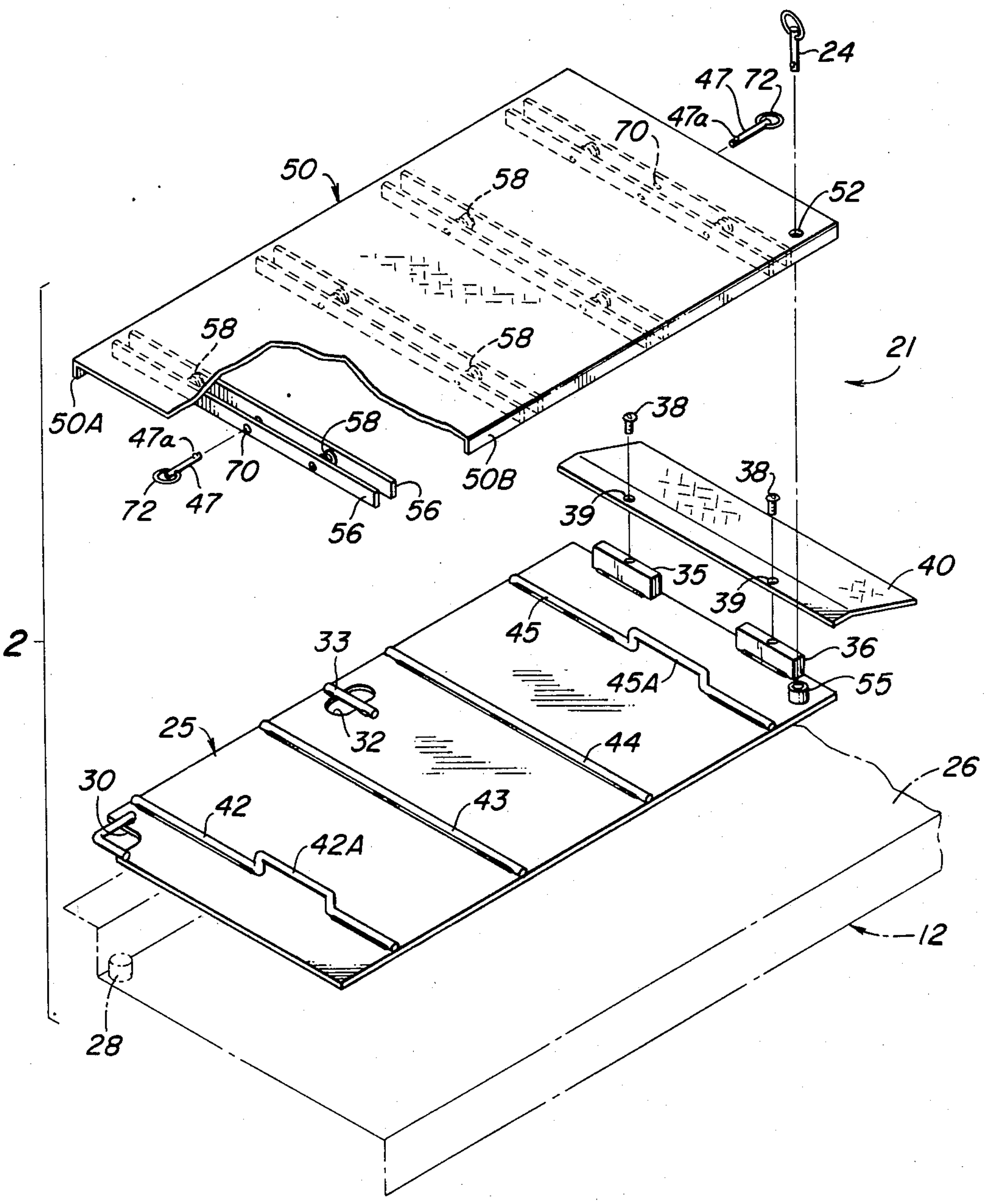
FIG. 2 is an exploded, perspective view of a slide plate assembly embodying several aspects of the present invention.

With particular reference to FIG. 2, the parts of a slide plate 21 may be seen to comprise a base plate 25 which is adapted to rest on the top surface 26 of the track 12. A locator stud 28 fixedly mounted to the track 12 extends into a locator hole 30 provided at the corresponding corner of the base plate 25. A second opening 32 is provided in the base plate 25 and a short rigid rod 33 is welded to the plate 25 and extends across the opening 32. A second stud, not visible in the drawings, extends up from the track 12 into the opening 32 to prevent horizontal movement of the slide plate assembly on the track 12.

As shown, the pair of mounting blocks 35 and 36 are fixed as by welding, to the top of the plate 25 adjacent to the rear edge thereof and have threaded holes for receiving headed screw 38 which extend through holes 39 in a ramp plate 40 to secure the ramp plate 40 to the base plate 25.

A plurality of rails 42, 43, 44 and 45 in the form of cylindrical steel rods are fixedly secured as by welding to the top surface of the base plate 25. The rails are arranged in substantial parallel relationship, and the two end rails 42 and 45 are provided with upstanding reversely bent elongated U-shaped portions 42A and 45A. As more fully described hereinafter, the rail portions 42A and 45A are used in conjunction with a pair of retainer pins 47 to lock a top slide plate 50 in assembled relationship with the base plate 25.

The slide plate 50 is provided with depending side flanges 50A and 50B and with a hole 52 which receives the removable locking pin 24 which extends into a sleeve 55 affixed to the base plate 25 to lock the top slide plate 50 against movement relative to the base plate 25.

Figure 3:
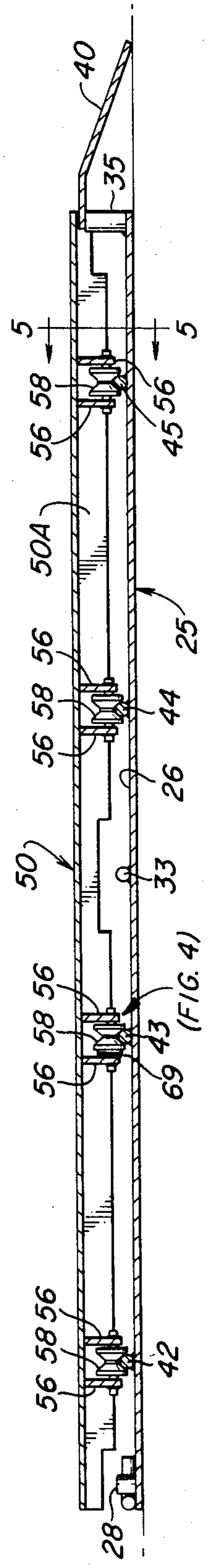
FIG. 3 is a cross-sectioned, elevational view taken along the line 3—3 of FIG. 1.
Figure 5:
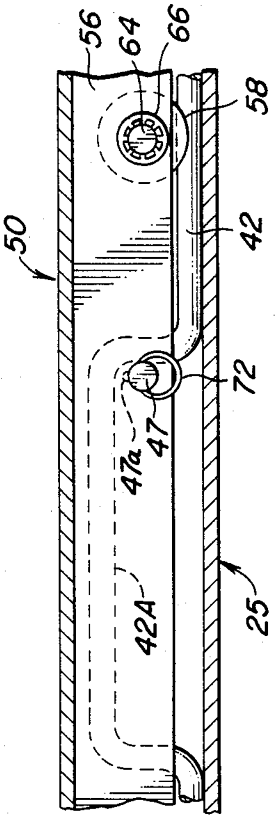
FIG. 5 is a partially cross-sectioned view taken along the line 5—5 of FIG. 3.
Figure 4:
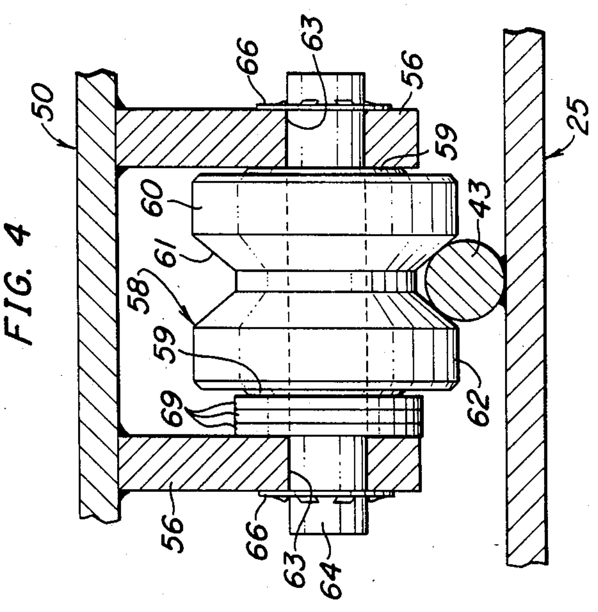
FIG. 4 is an enlarged partially cross-sectioned view of the slide plate assembly of FIG. 3 particularly showing one of the support wheels.

A plurality of pairs of elongated mounting brackets in the form of metal bars 56 are affixed as by welding in parallel relationship to the bottom surface of the slide plate 50 in positions corresponding to the respective positions of the rails 42, 43, 44 and 45. Two wheels 58 are journaled for free rotation between the bars 56 in each pair so as to be disposed directly over the respective rod. As best shown in FIGS. 3 and 4, all of the wheels 58 are identical, and each wheel includes a hub 59, a rim 60, and a circumferential V-groove 61 into which the rod 43 partially extends to space the peripheral edges 62 from the top surface of the base plate 25. As a consequence, the usual grease and dirt which collect on the plate 25 does not interfere with the free rolling of the of the wheels 58 on the rails 43.

As may best be seen in FIGS. 3 and 4 the bars 56 in each pair are provided with aligned holes 63 which receive the end portion of axles 64 and the wheels 58 are slidably mounted on the axles 64 between the bars 56 so as to be axially slidable along the axles. Preferably the wheels include internal ball bearings so that the rim portions 63 are freely rotatable on the hubs 59. The axles 64 are held in place by suitable spring washers 66 pressed onto the ends of the axles 64.

Inasmuch as the axle rods 42, 43, 44, and 45 are welded to the base plate 25 and the bars; 56 are welded to the slide plate 50, when normal shop tolerances are used all of the rails may not be precisely parallel to one another and the bars 56 may not be precisely parallel to one another. Therefore, in order to prevent binding of one or more of the wheels 58 as they roll along the rails, the wheels in only one set are shimmed to prevent axial movement thereof on their respective axes while the wheels in the other sets are free to move axially between the adjacent bars 56. As shown in FIG. 3, the hubs 59 of the second set of wheels from the left are held by a plurality of annular shims or washers 69 against one of the adjacent bars 56, and as a result, the slide plate 50 will precisely track the rail 43 while being supported by and freely movable on the other rails 42, 44 and 45.

As described above, the outer ones of the rails have the elongated, inverted U-shaped intermediate portions 42A and 45A, and the corresponding end pairs of the bars 56 are provided with aligned holes 70, best shown in FIG. 2, through which the retainer pins 47 extend. In order to secure the slide plate 50 to the base plate 25 the retainer pins 47 extend beneath the offset portions 42A and 45A of the end rails 42 and 45. A spring-loaded ball 47A is provided near the inner end of each pin 47 to prevent withdrawal thereof from the bar 56, and the ring 72 is provided for facilitating removal of the pin 47 from the bars to disassemble the slide plate 50 from the base plate 25.

While the present invention has been described in connection with a particular embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. A slide plate assembly for use with an automotive rack, comprising in combination a base plate, a plurality of guide rails mounted on the top face of said plate in substantial mutually parallel relationship, a top plate having an upper face on which a wheel of an automotive vehicle is adapted to rest, a plurality of sets of wheels mounted to the bottom of said top plate with the wheels in each set resting on a respective one of said rails, each of said sets of wheels including at least two wheels, removable locking means interconnected between said top plate and at least one of said rails for holding said top plate in assembled relationship with said base plate, a plurality of pairs of spaced apart, elongated brackets depending from the bottom of said top plate, and a plurality of axles mounted in parallel relationship between each of said pairs of brackets, said wheels in each of said sets being rotatably mounted on said axles between a respective pair of said brackets, at least one of said rails includes an elongated, upwardly offset portion, and said removable locking means includes a locking pin removably mounted to one of said brackets and extending beneath said offset portion of said one of said rails.

2. A slide plate assembly according to claim 1 wherein said offset portion of said one of said rails is disposed between the brackets in one of said pairs of brackets, and said locking pin extends through mutually aligned holes in said one of said pairs of brackets.

3. A slide plate assembly according to claim 5 wherein said offset portion of said one of said rails is interposed between two of the wheels in the associated set of wheels.

4. A slide plate according to claim 1 wherein said guide rails are cylindrical rods welded to the top of said base plate, and said wheels are each provided with a peripheral annular groove into which one of said rails extends with the rims of said wheels spaced from said base plate.

5. A slide plate assembly for use with an automotive rack, comprising in combination a base plate, a plurality of rails mounted on the top face of said plate in substantial mutually parallel relationship, a top plate having an upper face on which a wheel of an automotive vehicle is adapted to rest, a plurality of sets of wheels mounted to the bottom of said top plate with the wheels in each set resting on a respective one of said rails, each of said sets of wheels including at least two wheels, a plurality of axles on which said wheels are respectively rotatable, and means restricting the lateral movement of the wheels in one of said sets to a substantially greater extent than the permitted lateral movement of the wheels in the others of said sets, whereby said top plate tracks along the one of said rails on which the wheels in said one of said sets rest.

6. A slide plate assembly according to claim 5 wherein said rails are cylindrical rods welded to the top of said base plate, and said wheels are each provided with a peripheral annular groove into which one of said rails extends with the rims of said wheels spaced from said base plate.

* * * * *